United States Patent [19]

Jurek et al.

[11] 4,289,948

[45] Sep. 15, 1981

[54] AUTOMATIC VOLTAGE COMPENSATION FOR DIGITAL WELDER CONTROL SYSTEM

[75] Inventors: Dennis J. Jurek, Grafton; Marvin A. Guettel, Milwaukee; Michael Aslin, Cedarburg, all of Wis.

[73] Assignee: Square D Company, Palatine, Ill.

[21] Appl. No.: 58,356

[22] Filed: Jul. 17, 1979

[51] Int. Cl.³ .............................................. B23K 11/24
[52] U.S. Cl. .................................... 219/110; 219/114; 219/117.1; 323/300
[58] Field of Search ............ 219/108, 110, 114, 117.1; 323/19, 22 SC, 24, 106

[56] References Cited

U.S. PATENT DOCUMENTS

| | | | |
|---|---|---|---|
| 2,806,197 | 9/1957 | Rockafellow | 323/106 |
| 3,519,917 | 7/1970 | Martin | 323/22 SC |
| 3,875,367 | 4/1975 | Tanaka | 219/110 |
| 3,921,058 | 11/1975 | Tanaka et al. | 219/108 |
| 4,104,724 | 8/1978 | Dix et al. | 219/108 |

Primary Examiner—C. C. Shaw
Attorney, Agent, or Firm—Michael J. Femal

[57] ABSTRACT

An automatic voltage compensation control for a microprocessor controlled resistance welder system includes a digital voltmeter for measuring the line voltage cycle by cycle and associated circuitry to compensate the welding current in response to the measured line voltage in a manner which tends to hold the welding current constant and independent of line voltage variations. The digital voltmeter consists of a voltage-to-frequency converter coupled to a counter. The output of the voltage-to-frequency converter which is proportional to the line voltage is accumulated for the period of one cycle of the line frequency. This produces in the counter at the end of each measurement interval, a number of counts proportional to the average line voltage. The microprocessor using the count obtained adjusts the welding current by altering the timing of the firing points of the SCR contactors used to control the welding current.

2 Claims, 4 Drawing Figures

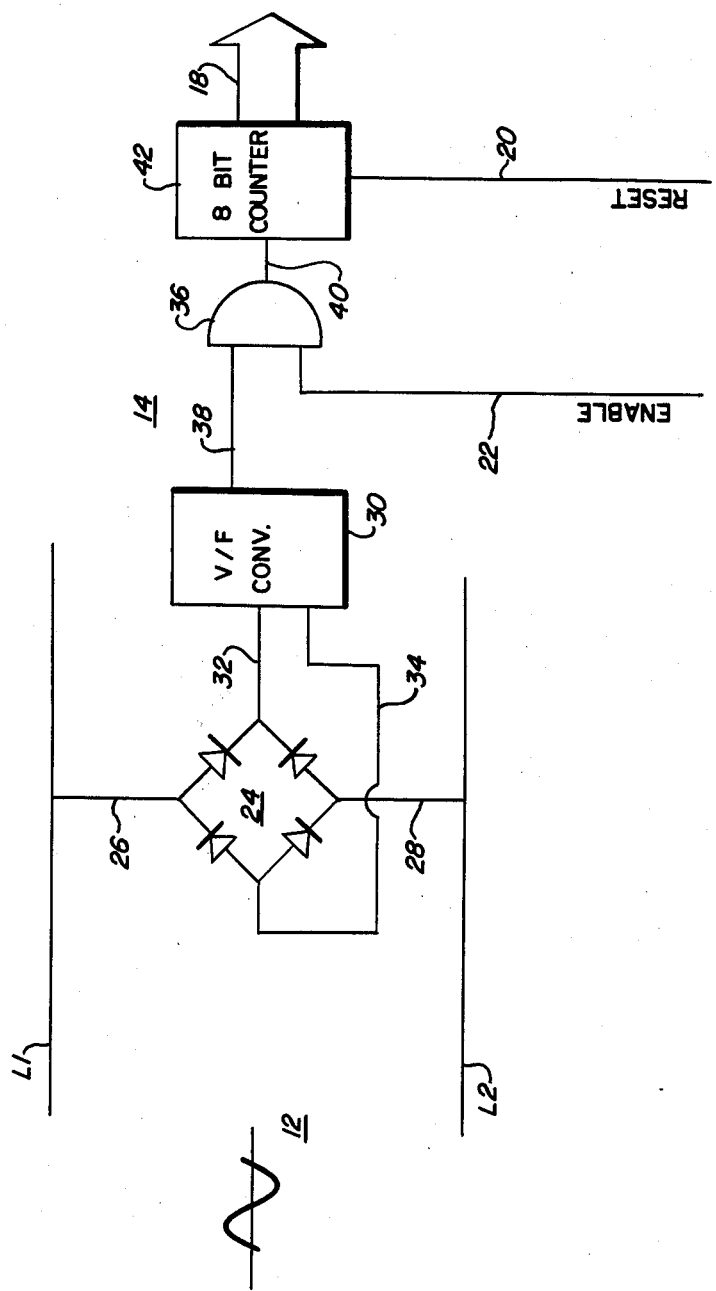

4,289,948

AUTOMATIC VOLTAGE COMPENSATION FOR DIGITAL WELDER CONTROL SYSTEM

BACKGROUND OF THE INVENTION

This invention relates to a digital welder control system and more particularly to a digital welder control system for the automotive industry in which varying line voltages are automatically compensated for in the controller to maintain a constant RMS current in the welding transformer secondary.

Portable or stationary gun welders have been used for many years in the automotive industry, and recently the automation of the welding operation for assembly line work to provide adequate control of the welding sequence has been successfully accomplished by the digital welder control system of U.S. Pat. No. 4,104,724 (hereinafter '724 patent).

However, in assembly line work, typically a large number of these portable stationary resistance welders are operating randomly resulting in line voltage variations due to the fluctuating heavy loads imposed which interfere with the production of quality welds. The maintenance of constant current is an important factor in weld quality due to the square law relationship between the current and the heat delivered to the weld. Thus, small errors in the current have a large effect on the total heat energy put into the weld. Line voltage variations naturally have a direct affect on the weld current. If at some instant in time most of the welders are operating, the line voltage will sag excessively and as a result, the welds being produced will receive insufficient energy. Conversely, if only a few welders are operating, the line voltage will tend to be high, thus, causing the welds to be made with excess energy. Thus, a welder control system which senses the line voltage and adjusts itself to hold the welding RMS current constant is advantageous because it will tend to produce uniform weld quality in the presence of line voltage variations. Avoidance of overwelding and the corresponding improvement in tip life and power consumption are desirable characteristics.

SUMMARY OF THE INVENTION

With this invention, the foregoing problems are substantially solved. The digital welder control system of the '724 patent is improved to handle the line voltage variations as described hereinabove by including voltage compensation circuitry and changing the firmware or, in other words, the executive program in the ROMs (Read Only Memories) of the microprocessor. The '724 patent is hereby incorporated by reference as the type of digital welder control system ideally suited for the addition of an automatic voltage compensation control according to the present invention. The automatic voltage compensation control of the present invention utilizes a digital voltmeter to measure the line voltage, a line polarity detector to sense a positive going polarity change for marking the beginning of each cycle and both the voltmeter and the detector are connected to an 8-bit microprocessor which is the main control element in a welder control system as fully described in the '724 patent. The digital voltmeter consists generally of a voltage-to-frequency converter, which responds in a linear manner to the absolute value of input voltage by producing an output pulse train with a frequency proportional to the input voltage. The pulse train is accumulated in an 8-bit counter internal to the voltmeter for a one cycle period of line voltage. The counter value proportional to the actual line voltage is then available to the microprocessor which interprets the counter information in accordance with the firmware (executive program in its ROMs). The microprocessor in turn initiates gating pulses which are applied to the SCR contactors that control weld current.

Accordingly, the principal object of the present invention is to provide a digital welder control system for the automotive industry that utilizes an automatic voltage compensation circuit which automatically compensates for changes in the line voltage of the installation so that a constant RMS current in the welding transformer secondary is maintained under such conditions of varying line voltage.

Another object of the present invention is to provide a digital welder control system for the automotive industry which utilizes a digital voltmeter with an internal counter that accumulates the pulse train which has frequency proportional to line voltage so that the controller's microprocessor can operate on the information obtained in the counter to gate the SCR contactors in the welder in a different time sequence to maintain constant current to improve weld quality despite line voltage variances.

Other objects and advantages will become apparent from the description wherein reference is made to the accompanying drawings illustrating the preferred embodiment of the invention.

DESCRIPTION OF THE DRAWINGS

FIG. 4 is a block diagram of the digital voltmeter shown in the controller of FIG. 1.

DESCRIPTION OF THE PREFERRED EMBODIMENT

Figure 1:
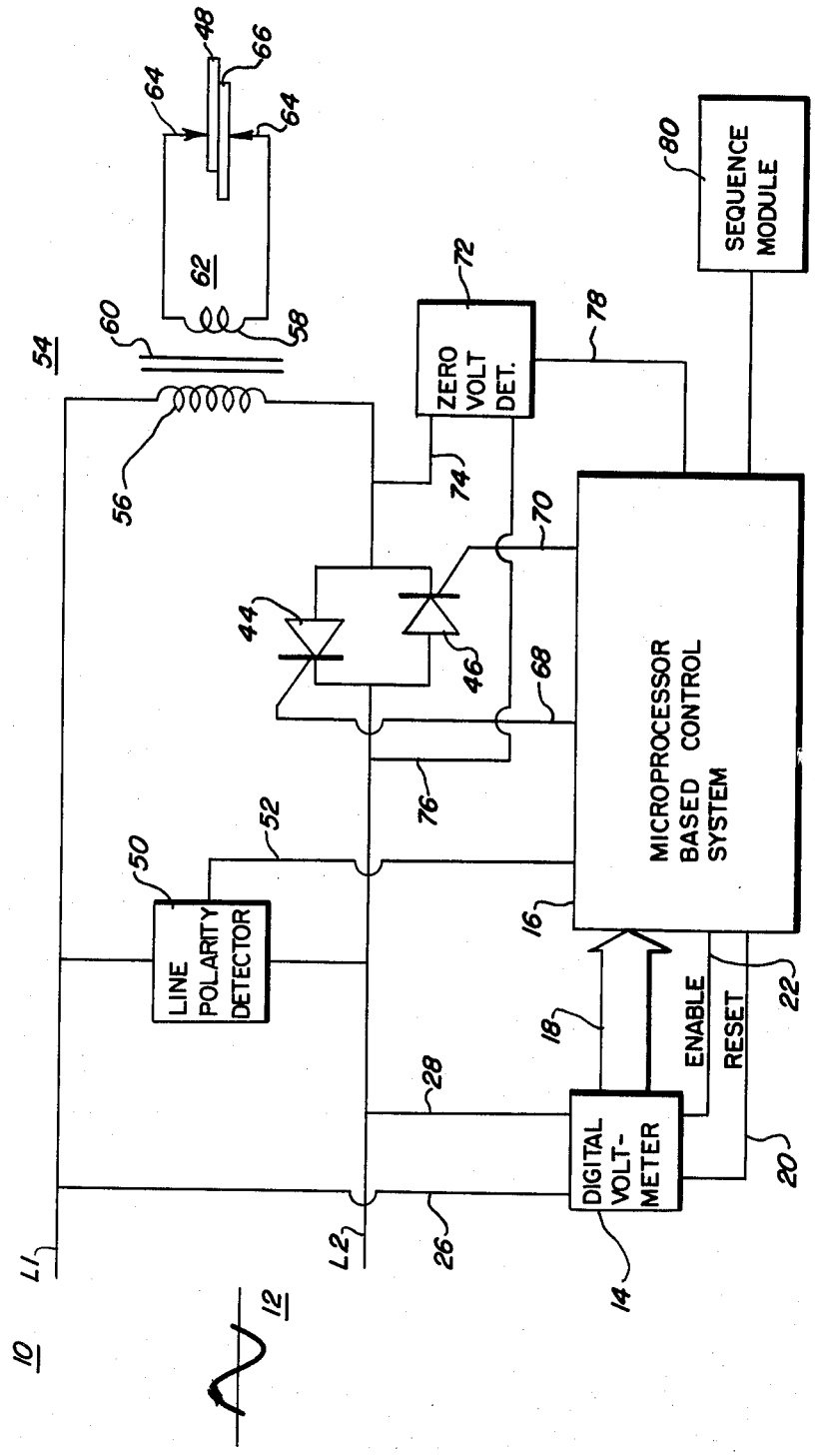
FIG. 1 shows a block and schematic representation of a portion of the digital welder control system embodying the principles of the present invention.

Referring to FIG. 1, a digital welder control system 10 including and automatic voltage compensation control that can be used in any general, industrial, commercial installation having line voltage variation is connected to a power source, such as an alternating current power source 12 having lines L1 and L2, which are connected in any known manner through a service entrance breaker as shown in the '724 patent.

The digital welder control system 10 consists of a block and schematic representation similar to that shown in a pending application (Our Docket No. IC-576, Ser. No. 956,138, Issued Oct. 30, 1978) with the addition of a digital voltmeter 14 and a change in the executive program of a microprocessor based control system 16, similar in most respects to that disclosed in the '724 patent. In fact, the digital welder control system 10 of FIG. 1 with the automatic voltage compensation (AVC) is, for all practical purposes, a block diagram and a schematic representation of circuitry both of which are similar to that of the '724 patent with the addition of the digital voltmeter 14, and 8-bit signal bus 18 connected to the microprocessor 16, and reset and enable control lines 20 and 22, respectively.

Referring now to FIGS. 1 and 4, the digital voltmeter 14 comprises a full wave bridge rectifier 24 connected across voltage lines L1 and L2 by input conductors 26 and 28, respectively, a voltage-to-frequency converter 30 is connected at its input to output conductors 32 and 34, an AND gate 36 connected to the output of converter 30 by a conductor 38, which, in turn, has output on line conductor 40 to an internal 8-bit counter 42, which receives the output pulse train from the voltage-to-frequency converter 30. The voltage-to-frequency converter 30 of the digital voltmeter 14 responds in a linear manner to the absolute value of the input voltage from lines L1 and L2 by producing an output pulse train with a frequency proportional to the input voltage from lines L1 and L2. As shown in FIG. 1, the digital voltmeter 14 is connected across the input lines L1 and L2 to the welder by conductors 26 and 28, thus sensing the line voltage available to the welding contactors 44 and 46 and a welding load 48. A pulse train is accumulated in the 8-bit counter 42 internal to the digital voltmeter 14 for a period of one full cycle of the alternating line voltage. At the end of one full cycle of line voltage, the counter 42 has accumulated within in it a number which is proportional to the average value of the line voltage during the cycle. This is nominally a count of 200, when the rated line voltage is applied to lines L1 and L2. A counter value is available to the microprocessor via the 8-bit bus 18. A microprocessor 16 performs the following actions when using the digital voltmeter 14. The beginning of a cycle is marked by a positive going polarity change of the line voltage, as detected by a line voltage polarity detector 50, which, in turn, is connected to the microprocessor 16 via line 52. Then, the microprocessor issues a reset pulse to clear the 8-bit counter 42 of the digital voltmeter 14 via line 20. Next, the microprocessor issues an enable pulse to the digital voltmeter 14 via line 22 which is the other input to AND gate 36 so that the pulse trains on conductor 38 from the voltage-to-frequency converter 30 are then fed via conductor 40 to the 8-bit counter 42. When the next positive going transition of the line voltage is detected (one whole cycle of line voltage), the microprocessor 16 disables the digital voltmeter 14 using the enable line 22 by changing the logic state of the signal on line 22, which, in turn, disables AND gate 36. The microprocessor then reads the count via the 8-bit bus 18, and then resets the counter 42 to zero via line 20 before it once again enables the digital voltmeter 14 via line 22 for the next cycle.

Referring once again to FIG. 1, the welding transformer 54 consists of a primary winding 56 and a secondary winding 58 about an iron core 60. The secondary circuit 62 contains the welding electrodes 64 and the work pieces 66. The SCR welding contactors 44 and 46 are controlled by suitably timed gating pulses via conductors 68 and 70 connected from the microprocessor 16 which controls both the amount of current and the duration of the current applied to the work pieces 66, as fully described in the '724 patent. A zero voltage detector 72 is used to sense the conducting state of the SCR welding contactors 44 and 46 via input conductors 74 and 76 across the welding contactors 44 and 46. A logic-one output on conductor 78 indicates conduction of the SCR welding contactors 44 and 46 and a logic-zero thereon indicates non-conduction of the SCR welding contactors 44 and 46. The output signal from the zero volt detector 72 on conductor 78 is used internally by the microprocessor 16 to properly time the initiation of the gating pulses applied to the SCR welding contactors 44 and 46 via their gate conductors 68 and 70, respectively.

A sequence module 80 is identical, for all practical purposes, as the one described in the '724 patent and is used as a remote display and control panel that is manually programmable by the operator for entry of welding data and for the display of the welder status.

The microprocessor-based control system 16 differs from that of the '724 patent, in that the firmware (executive program) has been altered so that the microprocessor has the ability to service a digital voltmeter 14 and to use the measurements therefrom to compensate the current for changes in the line voltage.

In operation, the voltage-to-frequency converter 30 of the digital voltmeter 14, as shown in FIG. 4, responds to the alternating line voltage of the welder by producing a frequency proportional to the alternating line voltage at any particular instant. The pulse train with a frequency proportional to the input voltage is gated through AND gate 36 to the 8-bit counter 42 by an enable signal on enable conductor 22 connected at one end to AND gate 36 and at its other end to the microprocessor 16 which generates the enable signal. The 8-bit counter 42 accumulates the count of the train pulse during the time the voltmeter 14 is enabled via conductor line 22. The voltmeter 14 is an average responding device and responds to the average value of the voltage during the time which it is enabled. As previously described, the voltage-to-frequency converter 30 is essentially across the input lines L1 and L2 to the welding transformer 54; the input to the voltage-to-frequency converter 30 is full wave rectified by bridge 24 to produce a wave having value varying from zero to the peak voltage. Normal operation under nominal line voltage would produce, during one full cycle of the 60 hertz current, a count of 200 in the 8-bit counter 42. The digital voltmeter 14 has two control lines, 20 and 22, going into it as previously described above. One is the enable conductor 22; and, when this line is held high by the microprocessor 16, the output of the voltage-to-frequency converter 30 is coupled into the 8-bit counter 42 through AND gate 36 where it will be counted. The reset conductor 20 connected between the 8-bit counter and the microprocessor 16 is used to bring the 8-bit counter 42 back to zero at the end of any measuring period.

Figure 3:
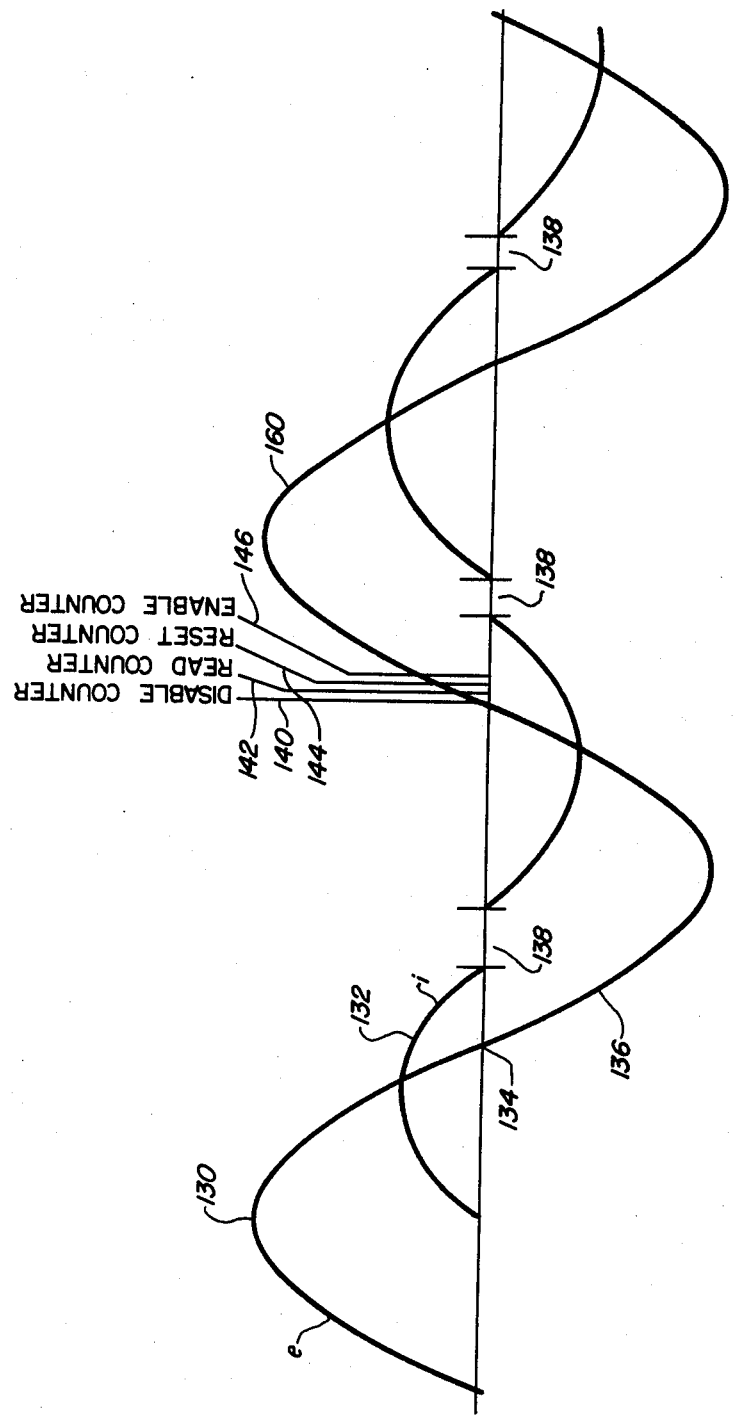
FIG. 3 shows current and voltage versus time diagram which serves to explain the automatic voltage compensation feature of the controller of FIG. 1.

A normal sequence for the microprocessor 16, when utilizing the digital voltmeter 14 to make a voltage reading proceeds as follows:

1. Upon receipt of a zero crossing indication from the zero volt detector 72, which is a lead trail device, via conductor 78 the microprocessor 16 will issue a zero on the enable conductor 22, which, in turn, results in an enable not signal. This enable not signal stops the 8-bit counter 42 from counting. AND gate 36 only has input on conductor 38 and is missng the input on conductor 22. After a few microseconds (there are 16,667 microseconds in a 60 hertz alternating voltage source 12) pass to allow the 8-bit counter 42 to settle out, the microprocessor 16 reads the state of the counter 42, as shown in FIG. 3, via the 8-bit bus 18 connected to it from the digital voltmeter 14. After reading, a momentary reset pulse is put out by the microprocessor via reset conductor 20 to zero the 8-bit counter 42; when the reset pulse on conductor 20 has been removed and the logic-one signal is put out on the enable conductor 22 to once again enable the digital voltmeter 14 for the next full cycle of voltage. One full cycle of 60 hertz current takes approximately 16,667 microseconds, as previously mentioned, so that the actual reading of the voltmeter, the enabling and the resetting functions all take place in approximately 20 microseconds so, essentially, the voltmeter 14 is used during the full cycle; that is, measuring with very little error. With nominal line voltage, the output of the digital voltmeter 14 is 200 counts for a normal full cycle of voltage. Under nominal line voltage conditions, the output of the digital voltmeter will correspond to 200 counts for an input voltage of 480 volts.

Typical line voltage variations seen in welding operations may be as much as +10% or −20% for a 480-volt line voltage situation. This would correspond to a digital voltmeter reading of 220 counts for the +10% case, and 160 counts for the −20% case. Upon taking a reading of the voltage, the microprocessor 16 compares the digital voltmeter reading with the number 200 or, in other words, subtracts the number 200 from the digital voltmeter reading. For instance, if the line voltage variation were 20% low (20% below the 480-volt level), the digital voltmeter count would be 160. When this value is subtracted from the reference 200, this gives us a delta volt change of 40. This delta volt change is plugged into an empirical equation by the microprocessor 16 to determine the change in the gap angle between half cycles of conduction which is necessary to raise the effective voltage applied to the welding transformer primary 56 in order to keep the welding current constant under the condition of a low line voltage. This set of empirical equations has been developed for use by the microprocessor 16 by a trial and test method, in order to supply the proper change in gap angle called delta theta. Delta theta equals delta voltage change divided by 89.79 (I-24). The numeral 89.79 and the numeral −24 are empirical constants derived by a best fit attempt to trial and error. This equation is used when delta voltage change is negative. When the delta voltage change is positive, a slightly different equation which is found to be a better fit is used and, in that case, delta theta equals delta voltage change divided by 89.79 (I-32). In this case, the 24 from the other equation is replaced by the number 32.

The microprocessor, which does not work in terms of degrees of angles, such as delta theta, has to work with a digital representation of delta voltage change. In this case, it is not the change in line voltage which is utilized, but the difference in counts between the digital voltmeter output, which is nominally 200, and the number 200, which represents exactly 480 volts on the line. Thus, if the line voltage were exactly at 480 volts, the delta volt change would be zero. The "I" in the equation is the actual number dialed in by the operator on the sequence panel representing the percent current selected, as described in the '724 patent. Because the microprocessor based control system 16 never works in terms of degrees of angle, it must work in terms of microseconds. Therefore, the equations, as previously described, can be modified by the changing of the constant to produce the appropriate change in microseconds in the gap time between half cycles of current conduction. And, these equations are as follows: Delta T, which is a change in the gap angle in microseconds, equals Delta V times the quantity I-24 divided by 128, for the negative Delta V. For the positive Delta V, it is the same equation again, only the 32 substituted for 24. This produces directly a number which the microprocessor can subtract from the gap time to produce appropriate gap timing or gating signals to the SCR welding contactors 44 and 46.

Figure 2:
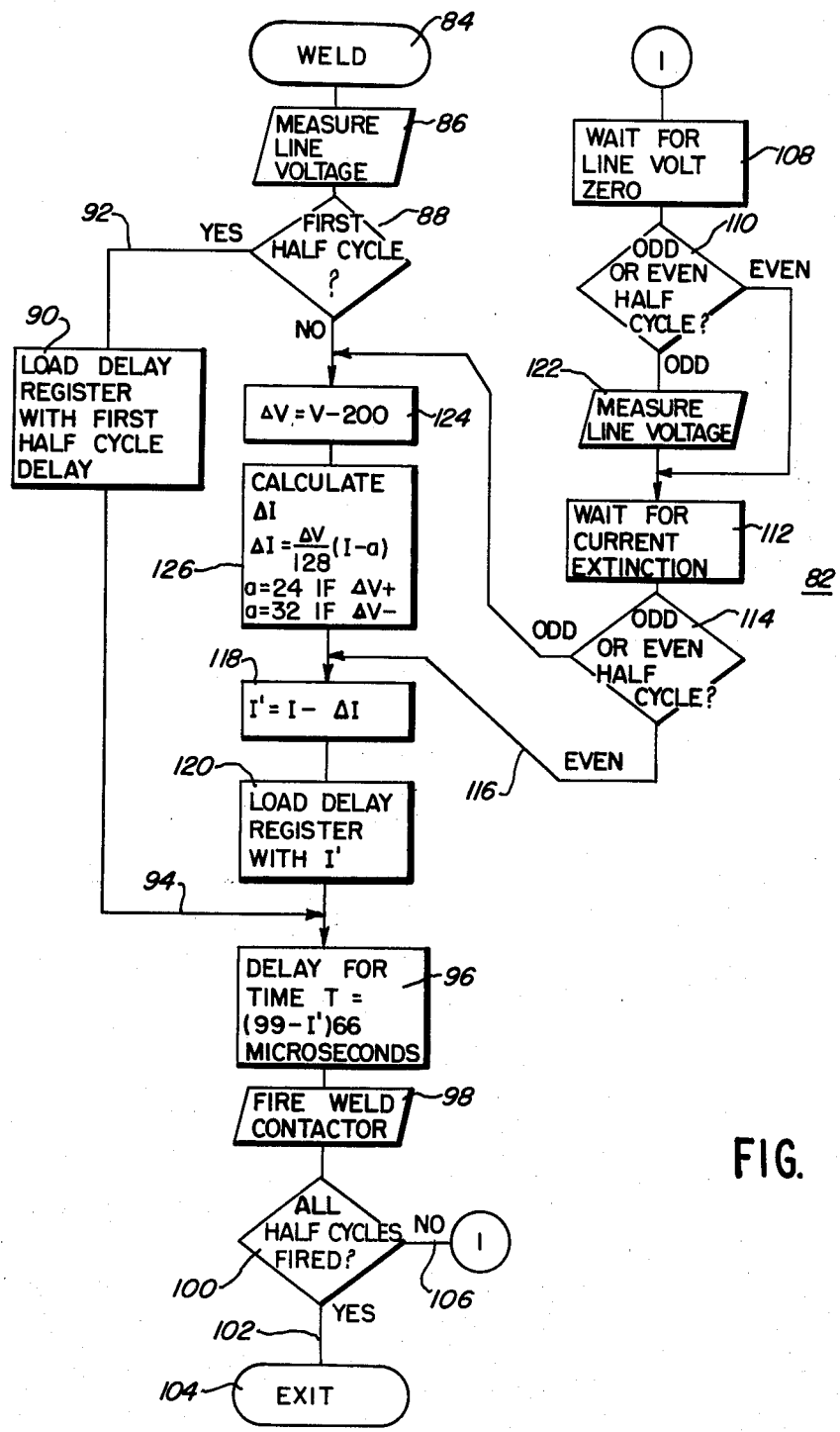
FIG. 2 is a partial flow chart of the executive program for microprocessor having the weld subroutine, the automatic voltage compensation of the present invention.

Referring now to FIG. 2, which is a flow diagram of weld subroutine 82, the microprocessor base control system 16 enters a weld subroutine at block 84 upon completion of the squeeze cycle essentially identical to that of the '724 patent. Upon entering the weld subroutine 82, the microprocessor 16 performs the steps necessary to read the digital voltmeter 14 via block 86. These steps consist of disabling the counter 42 to prevent further pulses from entering, causing a few microseconds to allow the counter to settle, extracting the count proportional to the line voltage from the counter, resetting the counter to zero, and finally once again enabling the counter for the next cycle. These steps are all accomplished in a few microseconds at no perceptible error to the measurement of the line voltage variations.

When a measure of the line voltage for a cycle is obtained, the decision block 88 directs control to block 90 via yes line 92, if this is the first half cycle of weld current. Block 90 provides for a delay in firing the first half cycle to avoid a welding transformer turn-on transient. The delay control is transferred from block 90 via line 94 to block 96. Block 96 forms the actual time delay by performing a repetitive sequence of instructions in such a way as to provide a time delay T is equal to (99-I prime) times 66 microseconds where "I" prime is the number previously loaded into the delay register, as fully described in the '724 patent. Note, zero less than equal to "I" prime less than equal to 99. At the end of the delay time, a block 98 initiates conduction of the SCR welding contactors 44 and 46.

If all of the predetermined half cycles of welding current have been fired, a decision block 100 exits subroutine via line 102 to exit status block 104. If all the half cycles have not been fired, then control passes to a block 108 where no further action is taken until the line voltage is detected to go through zero crossing by zero volt detector 72. When a zero voltage crossing is detected, a decision block 110 decides if the voltmeter 14 is to be read again based upon whether or not the machine is on an odd or even half cycle. After the first half cycle has been fired and a line voltage zero crossing has occurred, the welder will be operating on an even half cycle. Control of the microprocessor then proceeds to a block 112 where no further action is taken until the welding current goes to zero. This always occurs sometime after the line voltage zero occurs due to the inductive nature of the typical welding loads. After current has been seen to go to zero, a decision block 114 determines if an odd or even half cycle is under consideration. If even, control passes to a block 118 to calculate "I" prime equals "I" minus Delta I, where "I" is the desired percent current previously selected by the operator and Delta I is the adjustment to compensate for line voltage variations. For the first time through block 118, Delta I is equal to zero.

A block 120 then loads the delay register with "I" prime and transfers control to block 96 where a time delay is caused to occur for a time of T equals 99 minus "I" prime (times 66 microseconds). This controls the gap time between the extinction of current of a half cycle and the start of conduction on the next half cycle, thus, controlling the welding current.

A higher value of "I" prime will cause a shorter time delay and, thus, more current to be developed; conversely, a smaller value of "I" prime lengthens the gap and reduces the current. The next half cycle (half cycle two) is fired by block 98 with the logical events occurring as previously described. Block 110 now recognizes that half cycle number three is under consideration (block 108 has detected a further zero crossing) and, thus, causes the line voltage to be measured in a block 122. Proceeding via blocks 112 and 114, microprocessor enters a block 124 where the measured voltage "V" (a number proportional to the line voltage, nominally equal to 200) has subtracted from it 200 to obtain the voltage error Delta V. Using an empirically derived compensation equation, a block 126 calculates Delta I which is equal to Delta V divided by 128 times (I-A) where "A" equals 24 if Delta V is positive; and, "A" equals 32 if Delta V is negative. The empirical equation used in block 126 is a "best fit" straight line approximation of the non-linear correction curve. This curve varies with the load power factor and, thus, the empirical equation is optimized for the range of power factors which are expected to be encountered (about 0.5 to 0.9). The adjusted current "I" prime equals "I" minus Delta I is calculated by block 118, as previously described.

The adjusted current "I" prime changes in a manner that will tend to hold the load current constant. If the "V" (a measure of the line voltage) goes down, "I" prime goes up. Conversely, if "V" goes up, "I" prime goes down. Subsequent odd and even half cycles are handled in the manner described above with a voltmeter being read at the end of every full cycle of line voltage; the calculations performed to get "I" prime are used for the next full cycle of line voltage, etc.

At the end of the weld current pulse, the last half cycle has been fired as block 100 causes control to exit the weld subroutine via block 104. Subsequent action of the welder is then carried on in a manner identical to that of the welder described in the '724 patent.

Turning now to FIG. 3, FIG. 3 illustrates the voltage and current wave forms. The voltage of the first half cycle 130 is an odd half cycle. During the voltage of the first half cycle, a weld pulse is initiated by the start of a current half cycle 132. Before the current half cycle 132 goes to zero, a line voltage transition 134 occurs as a second half cycle 136 (an even half cycle) is entered. The voltage is read by the microprocessor just after entering each odd voltage half cycle and the compensation based on the most recent measurement is applied during the next two half cycles by altering a gap time 138. Therefore, the microprocessor includes firmware (executive program in the ROM) which performs the following actions on the wave form as shown in FIG. 3. At the beginning of each odd half cycle, as shown at the second odd half cycle 160, the microprocessor performs the following actions:

1. It disables the counter in the digital voltmeter as indicated by line 140;

2. It reads the value that is in the 8-bit counter 42 as indicated by line 142;

3. It resets the counter back to zero as indicated by line 144; and,

4. The counter is finally allowed to proceed counting once again for the next full half cycle of line voltage as indicated by line 146.

Preferably, the digital voltmeter is disabled prior to a reading to allow a carry to propagate fully through the counter resulting in a valid reading. This propagation takes one or two microseconds to occur. Note that the line voltage is measured only once for every cycle of line voltage. Thus, the same corrections apply to the following two half cycles.

We claim:

1. A digital welder control system for a resistance welder of the type connecting and disconnecting a welding transformer load from an alternating electrical source to control timing periods of the welding sequence and the level of heat intensity in the weld to insure quality welds, comprising:

a means responsive to a polarity change in line voltage for generating a signal representing the beginning of each cycle of line voltage;

a digital means responsive to the signals generated at the beginning of each cycle of line voltage for sensing the line voltage and for producing a digital signal therefrom proportional to the average line voltage, said digital signal being accumulated in said sensing and producing means for a period of one cycle of the line voltage; and a digital control means responsive to the accumulated digital signal of each cycle of line voltage, for adjusting the welding current by altering the timing of the firing points of the welding contactors in a next proceeding line voltage cycle and for maintaining the welding current constant and independent of line voltage variations.

2. In a digital welder control system for a resistance welder of the type connecting and disconnecting a welding transformer load from an alternating electrical source to control timing periods of the welding sequence and the level of heat intensity in the weld to insure quality welds, a method comprising:

generating a signal representing the beginning of each cycle of line voltage when a positive polarity change in line voltage occurs;

sensing the line voltage and producing a digital signal therefrom proportional to the average line voltage whenever the signal representing the beginning of each cycle of line voltage indicates a positive polarity change in line voltage occurs;

accumulating said digital signal for a period of one cycle of the line voltage; and, adjusting the welding current by altering the timing of the firing points of the welding contactors in a next preceding line voltage cycle and maintaining the weld current constant and independent of line voltage variations based on the accumulated digital signal of each cycle of line voltage.

* * * * *